United States Patent [19]

Beyer et al.

[11] Patent Number: 5,578,648
[45] Date of Patent: Nov. 26, 1996

[54] LAMINATION ADHESIVE CONTAINING THERMOPLASTIC RESINS AND UNMELTED THERMOPLASTIC FIBERS

[75] Inventors: Friedrich Beyer; Klaus Hölzel; Achim Werner, all of Hameln, Germany

[73] Assignee: Vorwerk & Co. Interholding GmbH, Wuppertal, Germany

[21] Appl. No.: 139,949

[22] Filed: Oct. 20, 1993

[30] Foreign Application Priority Data

Oct. 30, 1992 [DE] Germany .......................... 42 36 635.6
Nov. 12, 1992 [DE] Germany .......................... 42 38 196.7

[51] Int. Cl.$^6$ .......................... C08L 23/06; C08L 77/00; C08J 11/04
[52] U.S. Cl. .......................... 521/45.5; 521/40.5; 521/49.8; 156/94; 156/334; 264/37; 428/95; 428/97; 525/184
[58] Field of Search .......................... 156/94, 334; 264/37; 521/47, 45.5, 40.5, 49.8; 428/95, 97; 525/184

[56] References Cited

U.S. PATENT DOCUMENTS

| | | | |
|---|---|---|---|
| 4,028,159 | 6/1977 | Norris | 521/40.5 |
| 4,158,646 | 6/1979 | Benkowski et al. | 264/37 |
| 4,844,765 | 7/1989 | Reith | 156/306.6 |
| 5,217,655 | 6/1993 | Schmidt | 264/37 |
| 5,240,530 | 8/1993 | Fink | 428/903.3 |
| 5,294,384 | 3/1994 | David et al. | 525/184 |

FOREIGN PATENT DOCUMENTS

| | | |
|---|---|---|
| 669119 | 3/1966 | Belgium . |
| 9100631 | 4/1993 | Belgium . |
| 0005050 | 10/1979 | European Pat. Off. . |
| 0232522 | 8/1987 | European Pat. Off. . |
| 0264588 | 4/1988 | European Pat. Off. . |
| 2253616 | 7/1975 | France . |
| 2016085 | 10/1970 | Germany . |
| 2020761 | 11/1970 | Germany . |
| 2425751 | 12/1975 | Germany . |
| 2438749 | 2/1976 | Germany . |
| 2722774 | 11/1978 | Germany . |
| 4006766 | 9/1991 | Germany . |
| 60-206868 | 10/1985 | Japan . |
| 1132493 | 11/1968 | United Kingdom . |

OTHER PUBLICATIONS

R. Malloy et al. Reclamation of Automotive Carpet Scrap; Mar. 29, 1992.
Database WPI, Section Ch, Week 9346, *Derwent Publications Ltd.*, London, GB; Class A95, AN 93–365830 & JP-A-5 272 042 (Ikeda Bussan CO) 19. Oct. 1993.
Data Base Source (C) WIP Derwent AN 85–180267 & JP 60–107309 Jun. 12, 1985 (Ikeda Bussan KK).
Database WPI Week 8530, Derwent Publications Ltd., London, GB; AN 85–181298 (30) & JP-A-60 109 806 (Sekisui Chem Ind KK) 15. Jun. 1985.
Chemiefasern/Textilindustrie vol. 43, No. 3, März. 1993, Frankfurt/Main, DE Germany pp. 100–101 B. Ten Hoevel 'Aktuelle Teppichtrends'.
Database WPI Week 8548, Derwent Publications Ltd., London, GB; AN 85–299683 (48) & JP-A-60 206 868 (High Seat Kogyo KK) 18 Oct. 1985.
Database WPI Week 8409, Derwent Publications Ltd., London, GB; AN 84–051572 (09) & JP-A-59 009 021 (Hayashi Telemp KK) Jan. 18, 1984.
Database WPI, Week 8550, Derwent Publications Ltd., London, GB; AN 85–314023, & JPA60 219 016(Sekisui Chem. Ind.) 1. Nov. 1985.
Database WPI, Week 8316, Derwent Publications Ltd., London, GB; AN 83–37924K, & JP-A-58 041 910 (Kanebo) 11. Mar. 1993.
Moulding resin compsns. with lower heat distortion temp . . . Database WPI Week 8903, Derwent Publications Ltd., London, GB; AN 89–019698 & JP-A-63 295 615 (Teijin) 2 Dec. 1988.
Polyethylene naphthalene di:carboxylate polymers for packing food . . . Database WPI Week 8802, Derwent Publications Ltd., London, GB; AN 88–012327 Anonymous & Research Disclosure vol. 284, No. 003, 10. Dec. 1987.
Polystyrene composition–contg finely–powdered polyamide filler . . . Database WPI Week 7407, Derwent Publications Ltd., London, GB; An 74–12825V & SU-A-374 340 (Tolmacheva et al.) 23. Aug. 1973.

*Primary Examiner*—Thomas Hamilton, III
*Attorney, Agent, or Firm*—Martin A. Farber

[57] ABSTRACT

A carpet having pile threads forming a pile layer, a support layer which consists of fiber or ribbon material of polyolefins or polyester, and a back coating, the pile threads being attached to the support layer possibly by the back coating, and of a plastic of comparatively high resistance to temperature, in particular polyamide 6 or 6.6, and the back coating is attached as lamination to the top material. In order to obtain a strong attachment of the layers to each other, if possible without limiting the recyclability of the carpet, the back coating be effected by means of a lamination adhesive which contains unmelted fibers, in particular polyamide fibers.

17 Claims, 4 Drawing Sheets

LAMINATION ADHESIVE CONTAINING THERMOPLASTIC RESINS AND UNMELTED THERMOPLASTIC FIBERS

FIELD AND BACKGROUND OF THE INVENTION

The present invention relates to a carpet having pile threads forming a pile layer, a support layer which consists of fiber or strip material of polyolefins or polyesters, and a back coating, the pile threads being possibly bound by the back coating to the support layer, and consisting of a plastic of comparatively high temperature resistance, in particular polyamide 6 or 6.6, the back coating being bonded as lamination to the upper material.

The method of manufacture and the construction of such carpets are known. One object of the invention is so further to develop a carpet of this type that an extremely firm bonding of the layers to each other is obtained and that the possibility of recycling the carpet is also not limited by this after suitable treatment.

This object is achieved in, that the back coating is formed by means of a lamination adhesive which contains unmelted polyamide fibers. The other layers of the carpet can preferably also consist of plastic, for instance polypropylene and/or polyethylene. Over the back coating of the support material, the carpet can furthermore, in particular, have a back layer which is also referred as second back. In accordance with the invention, the lamination between the back layer and the support layer (also referred to as top material) is made particularly stable, namely directly by the lamination adhesive which also forms the back coating. Since the back layer and the support layer are formed of plastic, namely of polyolefins, in particular fibrous materials of polyolefins, namely preferably polypropylene or polyethylene, not only is an improvement of the carpet itself obtained but its recycling is also made possible. The polyamide fibers or other fiber components of the lamination adhesive do not prevent the reuse of the carpet but even favor it. The fiber portions of the lamination adhesive are, in particular, so selected that they are proportionate to the pile threads of the carpet. If, for instance, 30% fibers are contained in the carpet (referred to the mass), it is preferable that the lamination adhesive from which the back coating is formed also has 30% fibers (identical fibers). It is furthermore preferred that the lamination adhesive contain thermoplastic portions having a base of polyolefins. In addition to this, also portions of styrene/acrylate and/or styrene/butadiene, polyvinyl acetate, etc. Furthermore, antistatic additives in the form of carbon or conductive metallized fibers as well as chemical additives, for instance potassium formate (which is, for instance, conductive), etc. Due to the fact that a particularly firm bond is obtained between the support layer and the back layer, even a bonded carpet can be torn off again without parts remaining attached to the floor. The lamination adhesive also contains only (substantially similar) plastic portions so that, also in this way, recycling of the carpet is not limited despite improved adherence conditions. With regard to the thermoplastic polyolefin portions contained in the lamination adhesive, it is furthermore preferred that the lamination adhesive contain thermoplastic portions having a base of polyethylene. Furthermore, the lamination adhesive can also contain thermoplastic portions having a base of polypropylene. All being raw materials which are also contained in the carpet itself. In addition to this, the lamination adhesive can contain portions of styrene/acrylate and/or styrene/butadiene and/or polyvinyl acetate. It is also preferred that the lamination adhesive contain conductive components. For example, carbon fibers or metallized conductive fibers (the latter again preferably having a base of polyamide). In this way, the lamination adhesive can be made conductive, which is essential in the case of carpets for special uses, particularly computer rooms. Due to the fact that the lamination adhesive used contains fibrous components have a base of polyamide or the like, a conspicuous dull appearance of this layer is obtained when the layer formed by the lamination adhesive has hardened, which is of importance, for instance, if the back layer consists of a comparatively coarse fabric through which the lamination adhesive is apparent. Furthermore, an advantageous, textile-like character of a layer formed in this manner is obtained. This is of importance, for instance, if only the layer of lamination adhesive is applied to the previously produced top material and the second back is not used.

A carpet formed in this manner consists, as a whole, preferably of a pile material of polyamide 6 and/or polyamide 6.6 or the like. This pile material is needled into a support material of polypropylene forming the support layer, either a polypropylene nonwoven or a polypropylene ribbons. The anchoring of the pile material in the top material is furthermore preferably effected by means of a precoat having a base of copolymers of, for instance styrene/acrylate, styrene/butadiene, polyvinyl acetate, and the like. Furthermore, a lamination adhesive is present between the top material and the so-called second back. This lamination adhesive contains, for instance, polyamide portions (substantially in the form of unmelted polyamide fibers) of about 15 to 35%. Furthermore, a proportion of polyolefins of about 60–80%. Further portions, which may be desired for the adjustment of the conductivity of the lamination layer or are to be added to the component styrene/acrylate or the like, are present in an amount of about 3 to 6%. Preferred compositions of the lamination adhesive are, for instance 15 to 35% polyamide, 3 to 6% styrene/acrylate and 60 to 80% polyolefins (polypropylene, polyethylene, or the like). The second back can be a knitted or woven fabric, a nonwoven fabric or the like.

Another object of the invention is an adhesive in powdered or granulated form, particularly a lamination adhesive, for instance for the production of a carpet in one of the embodiments described above. In this connection, the adhesive furthermore has unmelted fiber components of polyamide or the like, for instance polyester, which are attached to each other by thermoplastic portions having a base of polyolefins, such as, for instance, polypropylene and/or polyethylene. These last-mentioned thermoplastic portions result in the desired adhesive action. For this purpose, the action of heat is necessary, it melting the polyolefin components but not the fiber portions having a base, in particular, of polyamide. For example, polyamide has a melting point of about 220° C. while the polyolefins used melt already at about 120° to 130° C. Furthermore, the adhesive may contain conductive substances, for instance conductive fibers or corresponding additions of chemical products. It is also preferred for the adhesive to contain portions of styrene/acrylate and/or styrene/butadiene, polyvinyl acetate, and the like.

A further object of the invention is a method of producing a lamination adhesive in powdered or granulated form, particularly an adhesive such as described above, preferably for use in a (further) production of carpets. In this connection, fibers having a base of polyamide or the like, for instance the pile material of a carpet, are subjected, together with thermoplastic plastics of, for instance, polyolefins, particularly polypropylene, polyethylene, etc., to the action of heat in such a manner that the fiber components, without themselves melting, are bonded to each other by molten thermoplastic material. For thee carrying out thereof, the agglomerates obtained are ground to granulate or powder form. Such a method can preferably be carried out in the manner that complete components of a carpet which consists essentially of pile material having a base of polyamide, in particular polyamide 6 and/or polyamide 6.6 or the like, and furthermore of components having a base of polyolefins, namely polypropylene and/or polyethylene, etc., are torn into small pieces and then agglomerated in a so-called "plastcompactor". A plastcompactor grinds these components, whereby a certain amount of heat is developed, leading to the melting of the low thermoplastic portions but not to the melting of the polyamide portions or the like. From the plastcompactor there is obtained a granulate-like mass which is introduced into a fine grinder. Temperatures which cause the melting of the fibrous polyamide pieces are not reached in the fine grinder. A powder obtained in this manner can be mixed with, for instance, pure polyethylene, for instance in an amount of 30%.

BRIEF DESCRIPTION OF THE DRAWINGS

With the above and other and other advantages in view, the present invention will become more clearly understood in connection with the detailed description of preferred embodiments, when considered with the accompanying drawings of which.

DETAILED DESCRIPTION OF THE PREFERRED EMBODIMENTS

Figure 1:
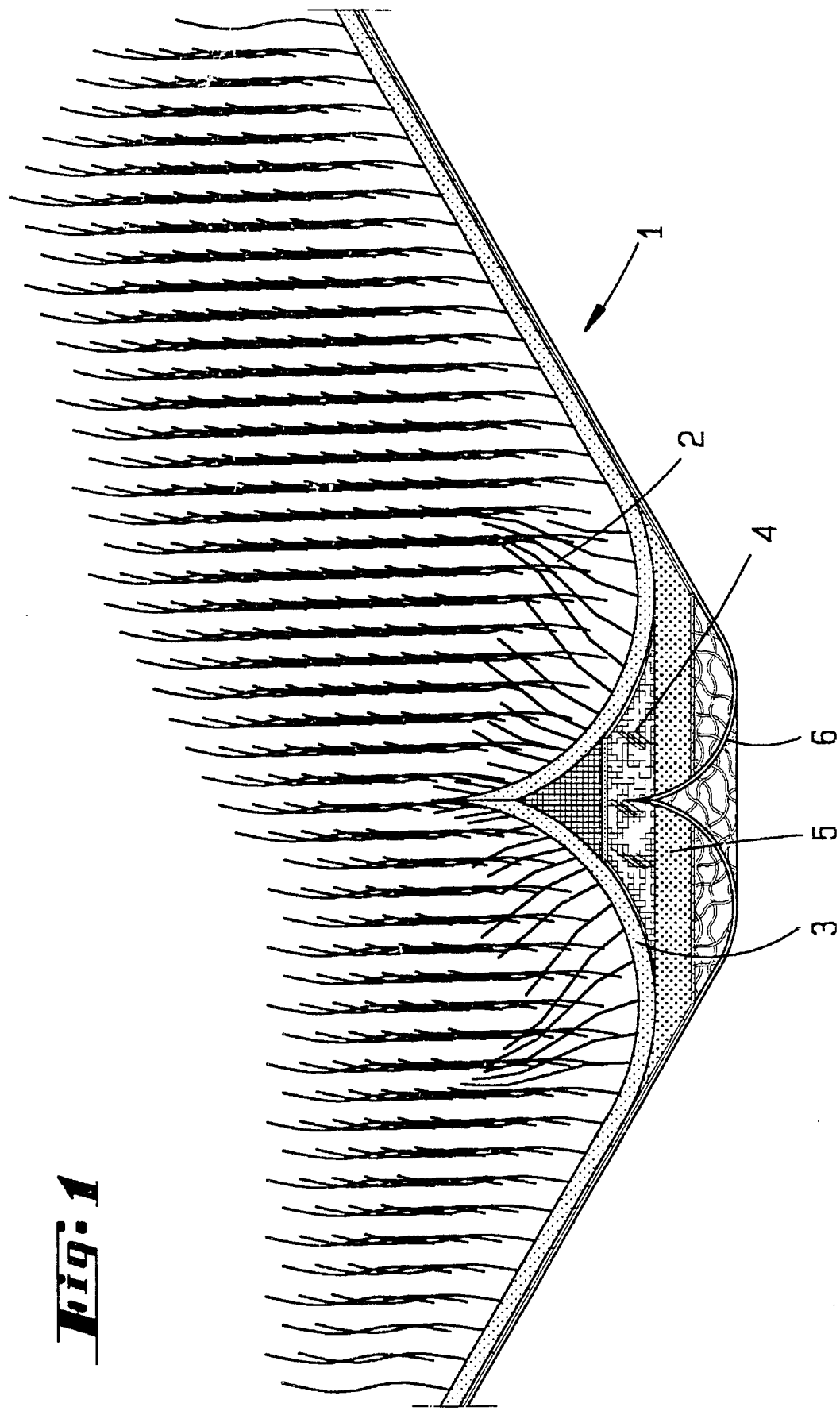
FIG. 1 shows diagrammatically a carpet partially separated into its parts.
Figure 2:
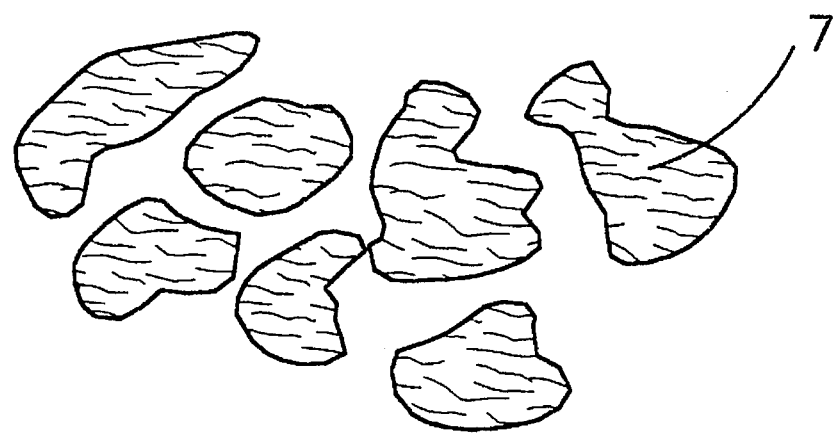
FIG. 2 is a diagrammatic showing of a lamination adhesive in granulate or powder form.
Figure 3:
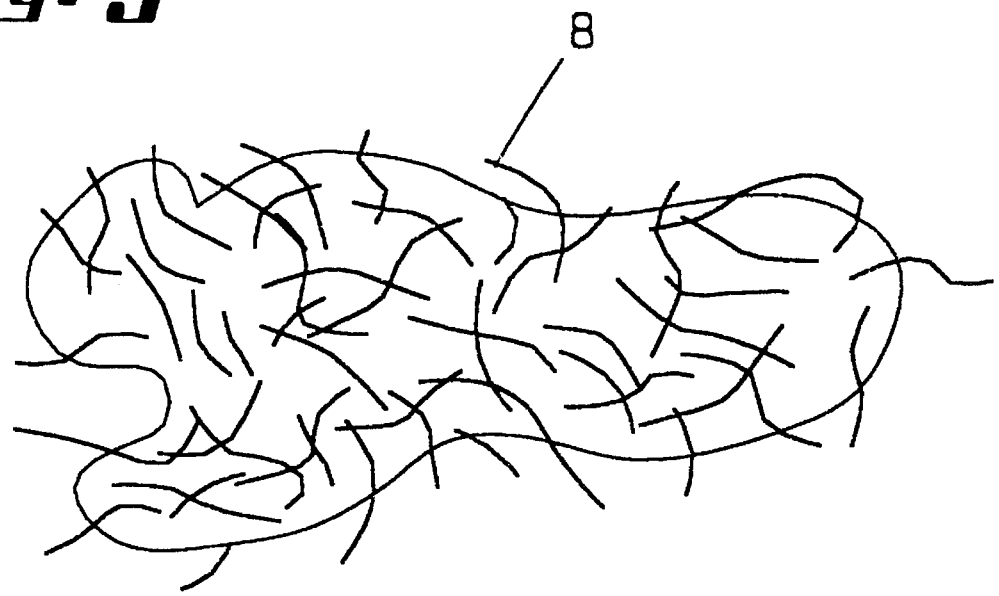
FIG. 3 is an individual showing of one granulate powder particle according to FIG. 2.
Figure 4:
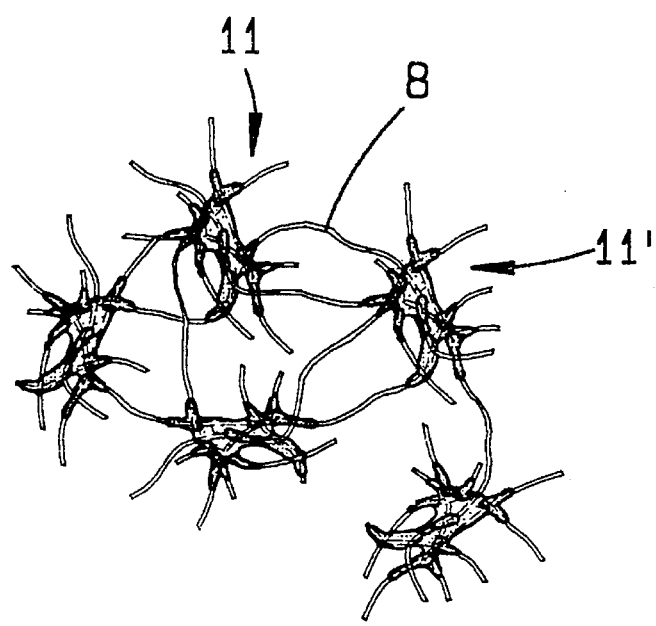
FIG. 4 is an enlarged diagrammatic showing of a powder particle which forms the basis of a granulate particle according to FIG. 3.

Referring to FIG. 1, there is first of all shown and described a carpet 1 which, shown diagrammatically in FIG. 1, has pile threads 2 which form a pile layer, consisting of polyamide 6 or polyamide 6.6, etc. These pile threads are needled into a support material 3. The support material can be nonwoven or ribbon fabric of polypropylene. A first attachment of the pile threads 2 to the primary support material 3 is obtained by a so-called precoat 4 which, in this case, is shown as a layer of exaggerated thickness. Actually, the precoat layer is very thin. The precoat consists of copolymers of, for instance, styrene/acrylate, styrene/butadiene, polyvinyl acetate, etc. The support material 3, together with the pile threads needled and attached therein—for instance on the basis of the precoat 4—is connected by a lamination 5, which is shown here for reasons of demonstration as a layer of exaggerated thickness, with a so-called textile second back 6. The lamination 5 has been furthermore referred to about also as back coating. This designation is directed at the fact that the second back 6 need not be present and in such case the lamination 5 forms the back of the carpet 1. In the embodiment shown, the textile second back 6 is a fabric having a base of polypropylene.

The lamination adhesive consists of a powder the adhesive components of which are thermoplastic plastic portions, in particular polyolefins, namely polypropylene, polyethylene, etc. Furthermore, this powder contains a high proportion of unmelted polyamide fibers. This proportion may constitute, for instance, 15 to 35% of the weight of the powder.

In the course of the lamination of the top material 3 with the back layer 6, the powder constituting the adhesive is heated, or subjected to such action of heat that the said thermoplastic portions but not the fiber portions having a base of polyamide are melted and, after cooling, produce the bond between the top material 3 and the back layer 6. The lamination adhesive also contains portions of styrene/acrylate. In particular, the lamination adhesive can have a composition such that 15 to 35% polyamide fiber portions are present, 3 to 6% styrene/acrylate portions, 60 to 80% polyolefins, including 20 to 30% polypropylene portions and 20 to 30% polyethylene portions.

In addition to this, conductive substances, such as conductive pile fibers and other conductive substances such as potassium formate can be present in the lamination adhesive. This is of importance, in particular, in the case of carpets for computer rooms. Due to the conductive nature of the layer of lamination adhesive, electrostatic charges can be avoided by immediate counteracting of the electric charges.

The adhesive, which is present in powdered or granulated form, is shown in detail in FIGS. 2 to 5. It consists macroscopically of individual particles 7 which are dry and, as a whole, form a pourable substance. Such a particle 7 is shown enlarged, but schematically, in FIG. 3. It can be seen that a plurality of polyamide fibers 8 produce the, as a whole, "fibrous" appearance of a particle 7. The polyamide fibers 8 are attached to each other, as shown in detail in FIGS. 4 and 5, by low-melting plastic portions which bond the polyamide fibers 8, in part enveloping them, as shown for instance by the reference numeral 9. This covering of low-melting thermoplastic plastic portions, however, as a rule extends only over a part of the length of a polyamide fiber 8. Larger accumulations, such as indicated by the reference numeral 10, of the thermoplastic portions also are present. There result fiber groups 11 (see, for instance, FIG. 4) which, on basis of longer polyamide fibers 8 connected to other fiber groups 11', are combined by entanglement to form a particle 7.

The adhesive granulate or adhesive powder has a composition such as already described above.

Figure 5:
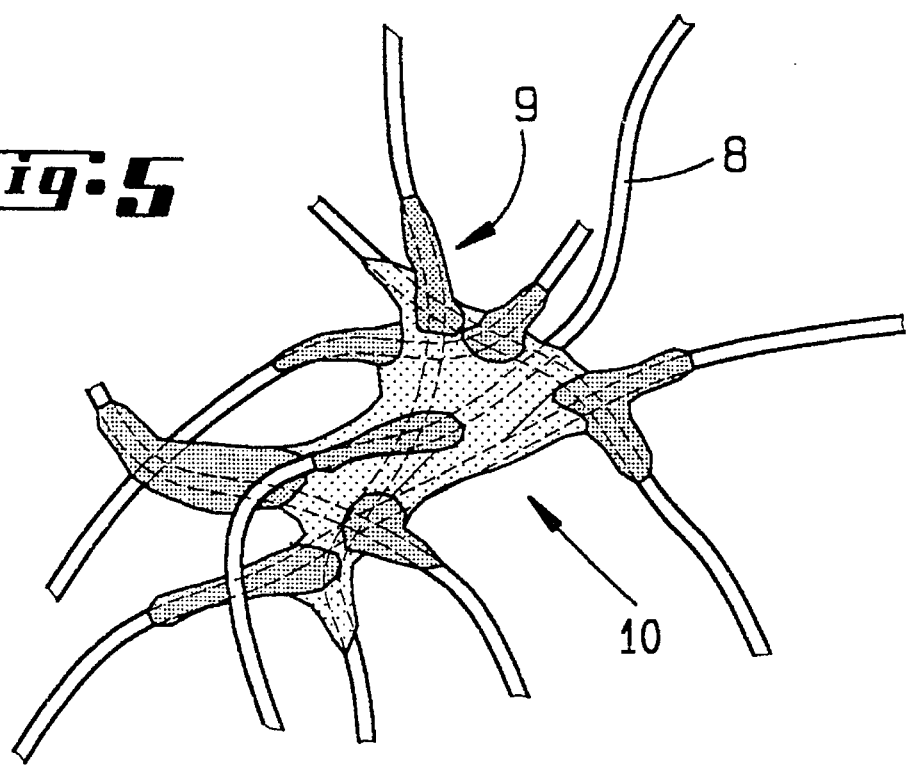
FIG. 5 is a further enlarged diagrammatic showing of a component of a powder particle according to FIG. 4.
Figure 7:
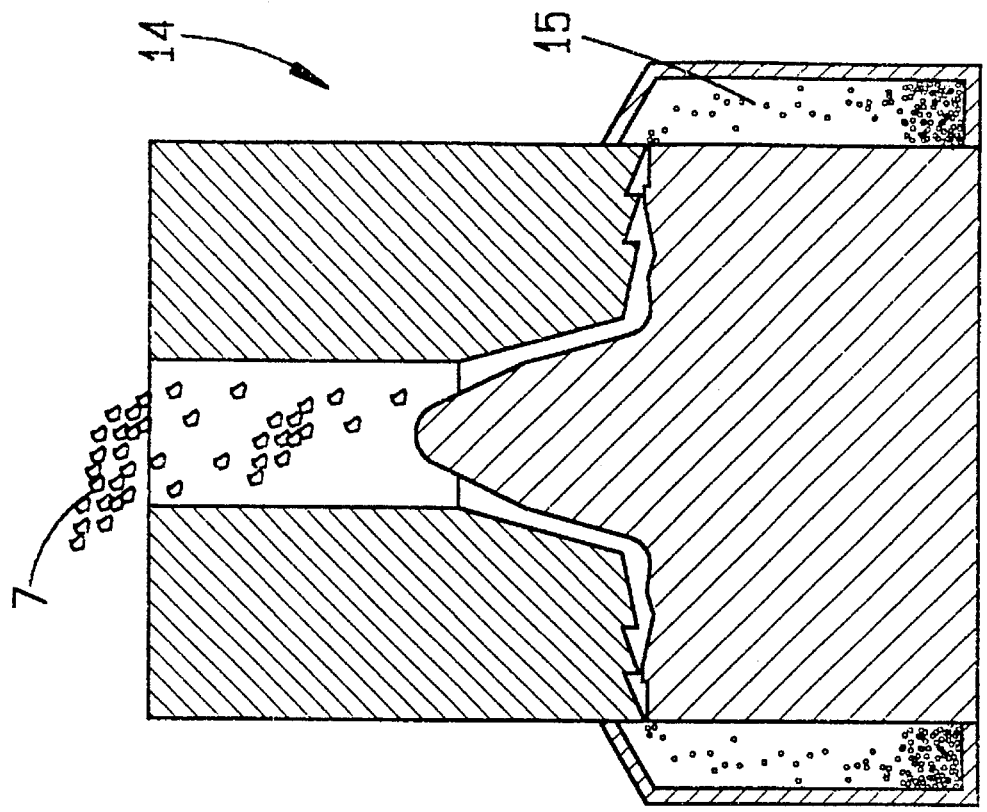
FIG. 7 shows an apparatus for the further comminuting to powder size of granulate bodies which were obtained in an apparatus according to FIG. 6.

While the granulate particles 7 have sizes of, for instance, 2 mm to about 5 or 7 mm, the powder particles have sizes of <1000 μm. Both forms, the granulate particles as well as the powder particles, are pourable. While in the case of the granulate particles 7, larger agglomerates of fibers thermoplastic melting portions which are attached to each other are present, the powder particles consist essentially of individual fiber groups, as shown in FIG. 5.

Such a lamination adhesive is preferably obtained by grinding, with the simultaneous action of heat and temperature control of a carpet, such as also described above.

In this case, the carpet 1, ground into carpet pieces 12 (see FIG. 4), is introduced into a so-called plastcompactor 13. It agglomerates the carpet pieces 12, the thermoplastic portions of polyolefins being melted by the—possibly controlled—development of heat, but not the pile fibers 2 of polyamide. As a result, there are obtained granulate particles 7 such as also described in detail in FIGS. 2 and 3. The control of the action of the heat can be obtained, for instance, by a different setting of the pressure in the grinding slot of the plastcompactor.

Figure 6:
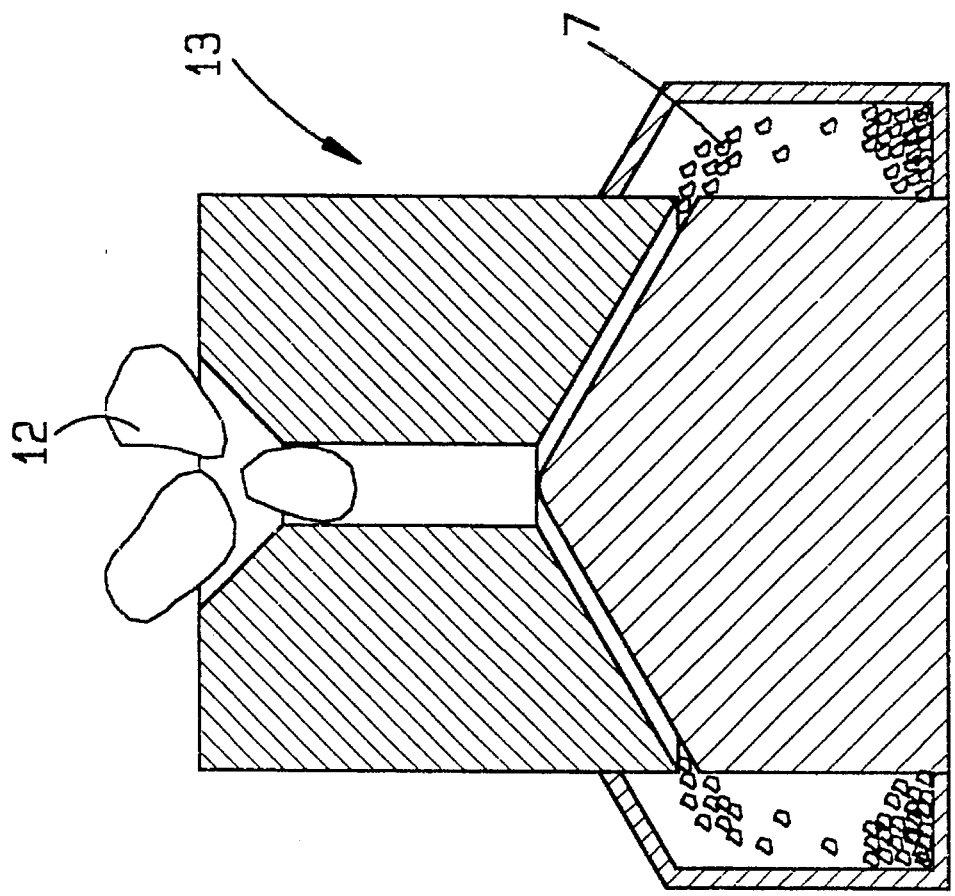
FIG. 6 shows an apparatus for the comminuting of carpet material.

These granulate particles 7 are introduced—with reference to FIG. 6—into another grinder, namely a fine grinder 14. As a result, there are obtained powder particles 15 such as shown individually—enlarged—in FIG. 5.

The powder obtained in this manner is preferably furthermore mixed with—pure—polyethylene in granulate or powder form, namely in a proportion of about 10 to 50%.

We claim:

1. A powdered or granulated lamination adhesive, comprising unmelted fibrous components of polyamide, and thermoplastic portions of polyolefin;

wherein said fibrous components of polyamide are attached to each other by said portions of polyolefin;

individual fibers of said polyamide are only partly covered with said thermoplastic portions of polyolefin; and an attachment of individual non-melted fibers of said polyamide comprises an enclosure of said polyamide fibers within a melt of said portions of polyolefin.

2. A powdered or granulated adhesive according to claim 1 further comprising a conductive substance for counteracting electric charges.

3. A powdered or granulated adhesive according to claim 1, further comprising portions of copolymers of styrene/acrylate, styrene/butadiene, or polyvinyl acetate.

4. An adhesive according to claim 1, wherein said fibrous components of polyamide comprise a base of polyamide 6 or 6.6.

5. An adhesive according to claim 1, wherein said fibrous components of polyamide comprise carpet pile material.

6. An adhesive according to claim 1, wherein said fibrous components of polyamide comprise a base of polyamide 6 or 6.6, and said thermoplastic polyolefins portions comprise a base of polyethylene and/or polypropylene.

7. An adhesive according to claim 2, wherein said conductive substance comprises potassium formate.

8. An adhesive according to claim 2, wherein said conductive substance comprises conductive pile fibers.

9. A method of manufacturing a powdered or granulated adhesive which adheres to polyolefins and polyesters, comprising the steps of subjecting fibrous material together with thermoplastic pieces of polyolefin to the action of heat;

adjusting the heat to provide for a melting of the polyolefin without a melting of the fibrous polyamide material;

agglomerating fibers of the polyamide material with the thermoplastic material to obtain a partial covering of the fibers with the thermoplastic material; and allowing attachment of individual non-melted fibers of the polyamide material by said thermoplastic plastic pieces of the polyolefin.

10. A method of producing a powdered or granulated adhesive according to claim 9, further comprising the step of obtaining the plastic pieces of polyolefin by tearing a carpet into pieces under the action of heat.

11. A method of producing a powdered or granulated adhesive according to claim 9, further comprising the step of obtaining the plastic pieces by tearing, under the action of heat, pieces of a carpet having a pile material with a base of polyamide 6 or polyamide 6.6, the carpet further comprising a support material of a polypropylene nonwoven or polypropylene ribbon fabric with a precoat of copolymers of styrene/acrylate or styrene butadiene or polyvinyl acetate.

12. A method for the production of a powdered or granulated adhesive according to claim 9, wherein said adhesive is a granulate, the method comprising a further step of grinding said granulate with granulate particles of an order of magnitude of 2 to 7 mm to form a powder with particle sizes of the order of magnitude of <1000 µm.

13. A method of producing a powdered or granulated adhesive according to claim 9, further comprising a step of adding further thermoplastic plastic portions in an amount of about 10 to 50% of an initial quantity of the polyolefin.

14. A method of producing a powdered or granulated adhesive according to claim 13, wherein the thermoplastic plastic portions are in an amount of 30% of the initial quantity.

15. A method according to claim 9, wherein said subjecting step comprises a subjecting of a polyamide having a base of polyamide 6 or 6.6 with the pieces of polyolefin to the action of heat.

16. A method according claim 9, wherein said subjecting step comprises a subjecting of a polyamide having a base of polyamide carpet pile material with the pieces of polyolefin to the action of heat.

17. A method of producing a powdered or granulated adhesive according to claim 9, further comprising the step of obtaining the plastic pieces by tearing, under the action of heat, pieces of a carpet having a pile material with a base of polyamide 6 or polyamide 6.6, the carpet further comprising a support material of a polypropylene nonwoven or polypropylene ribbon fabric with a precoat of copolymers of styrene/acrylate or styrene butadiene or polyvinyl acetate, the carpet further comprising a lamination adhesive of polyamide fibrous material encased with thermoplastic polyolefin material, and a back layer having a base of polyolefin including polypropylene or polyethylene.

* * * * *